US006868860B2

(12) United States Patent
Davidson

(10) Patent No.: US 6,868,860 B2
(45) Date of Patent: Mar. 22, 2005

(54) FIRE HYDRANT WITH SECOND VALVE

(75) Inventor: Thomas Dewey Davidson, Griffin, GA (US)

(73) Assignee: Davidson Hydrant Technologies, Inc., Sunnyside, GA (US)

( * ) Notice: Subject to any disclaimer, the term of this patent is extended or adjusted under 35 U.S.C. 154(b) by 120 days.

(21) Appl. No.: 10/309,646

(22) Filed: Dec. 4, 2002

(65) Prior Publication Data

US 2004/0123992 A1 Jul. 1, 2004

(51) Int. Cl.[7] ............................. E03B 9/04; F16K 11/10; F16K 15/18
(52) U.S. Cl. ....................... 137/299; 137/272; 137/540; 137/542; 137/614.2
(58) Field of Search ................................ 137/272, 299, 137/300, 540, 542, 614.2

(56) References Cited

U.S. PATENT DOCUMENTS

| 154,087 | A |   | 8/1874 | Roberts |         |
|---------|---|---|--------|---------|---------|
| 726,369 | A |   | 4/1903 | Sullivan |         |
| 1,562,223 | A |   | 11/1925 | Gannestad |       |
| 1,601,993 | A | * | 10/1926 | Blake | 137/299 |
| 2,244,993 | A |   | 6/1941 | Hollifield |       |
| 2,515,770 | A |   | 7/1950 | Grönberg |         |
| 3,035,609 | A |   | 5/1962 | Dyer |              |
| 3,294,109 | A |   | 12/1966 | Smith |            |
| 3,475,978 | A |   | 11/1969 | Dunton |           |
| 3,566,905 | A | * | 3/1971 | Noland | 137/301 |
| 3,586,019 | A |   | 6/1971 | Thomas et al. |    |
| 3,939,861 | A | * | 2/1976 | Thompson | 137/299 |
| 3,952,770 | A | * | 4/1976 | Botnick | 137/301 |
| 3,980,097 | A |   | 9/1976 | Ellis |            |
| 4,139,931 | A |   | 2/1979 | Royce |            |
| 4,393,891 | A | * | 7/1983 | Snoek et al. | 137/299 |
| 4,475,570 | A | * | 10/1984 | Pike et al. | 137/218 |
| 4,602,654 | A | * | 7/1986 | Stehling et al. | 137/296 |
| 4,791,952 | A |   | 12/1988 | Laurel |           |
| 4,909,270 | A | * | 3/1990 | Enterante et al. | 137/218 |
| 5,029,603 | A | * | 7/1991 | Ackroyd | 137/218 |
| 5,129,416 | A | * | 7/1992 | Ackroyd | 137/218 |
| 5,549,133 | A |   | 8/1996 | Sigelakis |        |
| 5,609,179 | A |   | 3/1997 | Knapp |            |
| 5,622,202 | A |   | 4/1997 | Etter et al. |     |
| 6,401,745 | B1 |   | 6/2002 | Corder |           |
| 6,488,048 | B2 | * | 12/2002 | Kuhmayer et al. | 137/540 |

FOREIGN PATENT DOCUMENTS

| CH |   191132   | * | 3/1937  | ............... 137/299 |
| CH |  675139 A  |   | 8/1990  |                         |
| DE |  229997 C  |   | 1/1911  |                         |
| DE |  236645    | * | 7/1911  | ............... 137/299 |
| DE |  639655 C  |   | 12/1936 |                         |
| EP | 0 113 913 A1 |  | 7/1984 |                         |
| EP | 0 463 702 A1 |  | 1/1992 |                         |
| FR |  2773373   |   | 7/1999  |                         |

OTHER PUBLICATIONS

International Search Report, May 4, 2004, issued by European Patent Office for PCT US03/37681.

\* cited by examiner

*Primary Examiner*—George L. Walton
(74) *Attorney, Agent, or Firm*—Kilpatrick Stockton, LLP

(57) ABSTRACT

Fire hydrants which feature additional structure for reducing the potential that those with ill intent can foul municipal water supplies by introducing toxins or other materials into fire hydrants. Various embodiments include valves which close off portions of the hydrant otherwise available for receipt of toxic or other materials when the fire hydrant nozzle cap is unscrewed and open. Such valves preferably open, manually or automatically, when water is flowing from the water supply through the nozzle, a condition which renders it difficult at best to introduce toxins through the hydrant into a water supply, but close off portions of the barrel when the nozzle is open and water is not flowing through the nozzle.

22 Claims, 8 Drawing Sheets

FIRE HYDRANT WITH SECOND VALVE

The present invention relates to fire hydrants which include additional valving in order to render more difficult the task of introducing toxins into a water supply.

BACKGROUND

Conventional fire hydrants offer access to a municipal water supply in a manner in which operatives with ill intent may appreciate. Briefly, conventional fire hydrants include at least one nozzle for coupling to a fire hose. The nozzle is closed off by a threaded cap when the hydrant is not in use. The hydrant also includes a hydrant valve which controls flow of water from the water supply to and through the hydrant, through the nozzle, and into the fire hose.

Conventionally, the barrel of the hydrant between the nozzle and the hydrant valve, which is in the lower portion of the hydrant, accommodates several gallons of fluid. Accordingly, it is possible to unscrew a nozzle cap, introduce gallons of toxin, reattach the nozzle cap and open the hydrant valve to allow the toxins to communicate with and flow by gravity and perhaps at least to some extent by Bernoulli's principle, into the municipal water supply, since when the nozzle cap is attached, water pressure from the water supply would not force the toxins back out of the hydrant.

SUMMARY

One or more of various structures and embodiments according to the present invention may be introduced between the nozzle and the hydrant valve in order to make it more difficult or impossible to introduce toxins to a water supply through a fire hydrant. Structures such as valves according to various embodiments of the present invention permit flow of water when a nozzle is open and the hydrant valve is open, but prevent or substantially prevent flow of water through the valve and thus close off portions of the hydrant barrel when a nozzle is open but the hydrant valve is closed.

Valves or other structure according to various embodiments of the present invention are preferably introduced between the lowest nozzle in the hydrant and the main hydrant valve. They may form at least two general types:

(1) Valves which operate logically as an "and" gate to open only when both the hydrant valve and at least one nozzle is open but to be closed at all other times; and (2) Valves which operate in concert with the hydrant valve.

Preferably, valves according to various embodiments of the present invention are located in the vicinity of the bottom of the lowest nozzle in the hydrant.

It is accordingly an object of various embodiments of the present invention to provide additional structure for fire hydrants in order to reduce the possibility of toxins being introduced into a water supply.

It is an additional object of various embodiments of the present invention to provide structures for retrofitting into fire hydrants in order to reduce the possibility of toxins being introduced into a water supply.

It is an additional object of various embodiments of the present invention to provide structure interposed between nozzles of fire hydrants and their hydrant valves, through which water actually flows when at least one nozzle and the hydrant valve is open.

Other objects, features, and advantages of various embodiments of the present invention will become apparent with respect to the remainder of this document.

BRIEF DESCRIPTION

DETAILED DESCRIPTION

Figure 1:
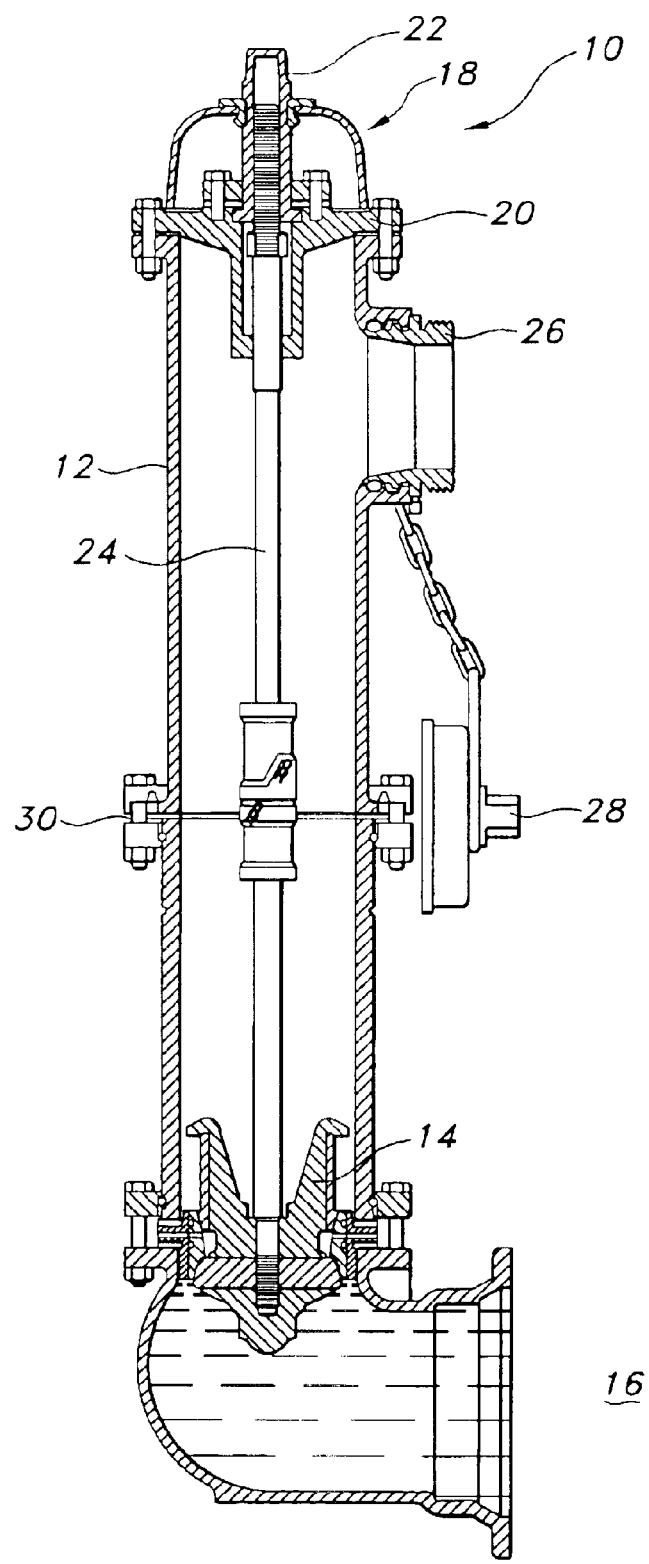
FIG. 1 shows a cross section of one version of a conventional fire hydrant with nozzle cap removed and hydrant valve closed.

FIG. 1 shows a conventional fire hydrant 10. Hydrant 10 typically includes a substantially vertical barrel 12 through which water may flow from a water main to a fire hose given certain circumstances as discussed generally below. At one end of the barrel 12 is a hydrant valve 14 which controllably interrupts fluid flow between a water supply 16 and the barrel 12. At the upper end of the barrel 12 may be found a cap structure 18 which can include, for instance, a housing cover 20 and an operating nut 22 which rotates within the housing cover. The operating nut 22 includes threads which receive threads on an actuator rod 24 which in turn connects to the hydrant valve 14. Not only does the cap structure 18 seal the top portion of the barrel 12 in waterproof fashion, but operating nut 22 may be used by fire fighters or others to open the hydrant valve 14 via actuator rod 24. Hydrant 10 includes at least one nozzle 26 and can include more nozzles 26. Each nozzle 26 may be closed with a cap 28 such as a threaded cap. The hydrant may also include breakaway structure such as a traffic feature 30.

In normal operation, the hydrant 10 may be employed as follows to help fight fires, provide refreshing summer breaks for overheated urban citizens and/or their offspring, participants in road races, or for other purposes or beneficiaries. First, a hose (not shown) may be connected to nozzle 26, usually in a threaded fashion after the cap 28 has been removed (See, e.g., FIG. 1). Then, after the hose is connected, operating nut 22 may be rotated with a wrench to cause actuator rod 24 to push down on relevant portions of hydrant valve 14 in order to open hydrant valve 14 (See, e.g., FIG. 4). When valve 14 opens, water flows from the water supply 16 through hydrant valve 14 through barrel 12, out nozzle 26 into the hose and accordingly toward its desired application or destination.

Figure 2:
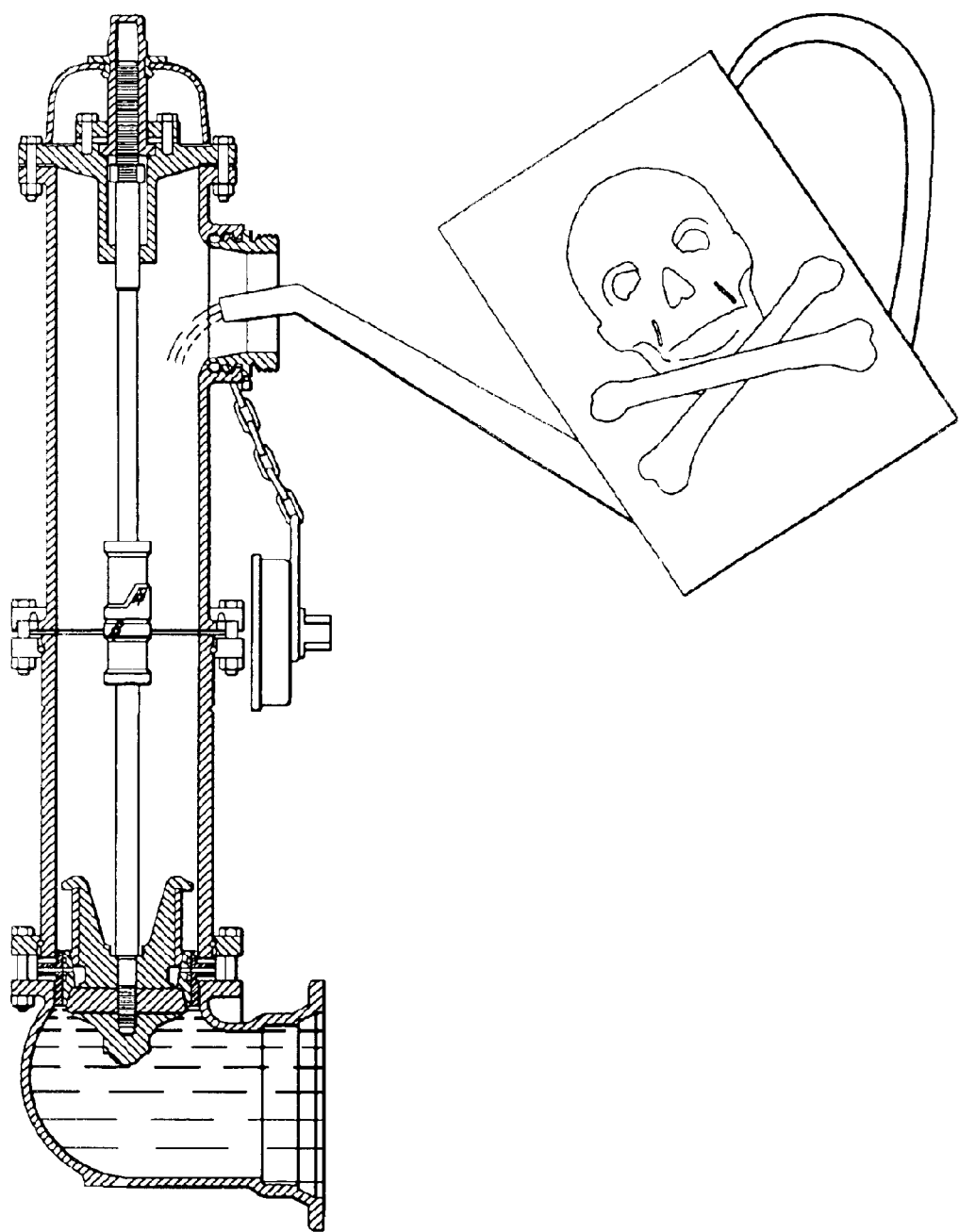
FIG. 2 shows toxins being introduced into the nozzle of the hydrant of FIG. 1.
Figure 3:
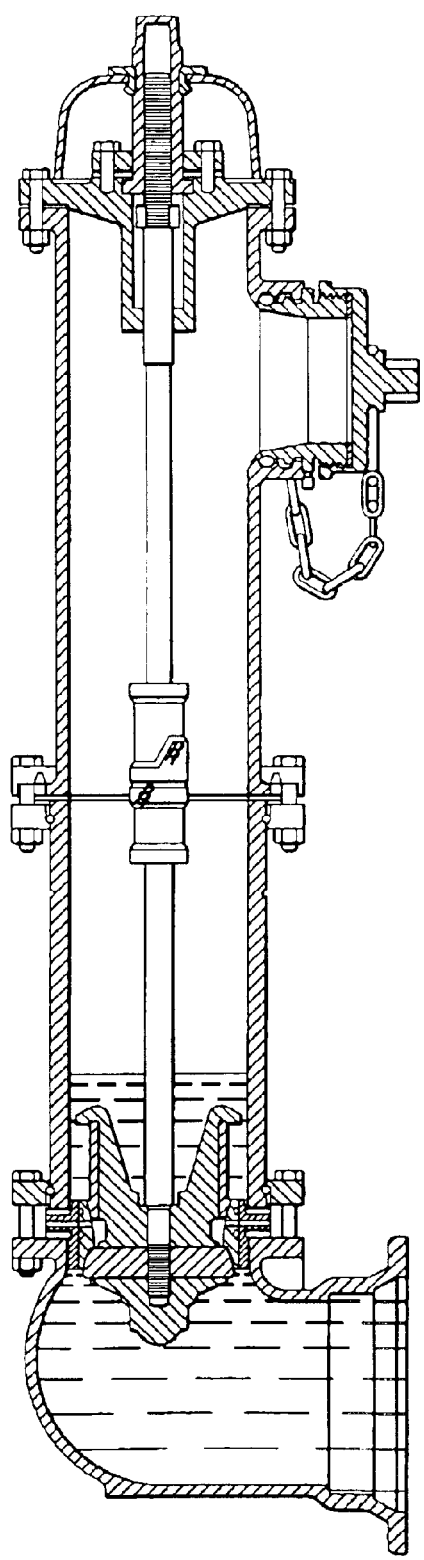
FIG. 3 shows the cap replaced on the nozzle of the hydrant of FIG. 1 after toxins have been introduced.
Figure 4:
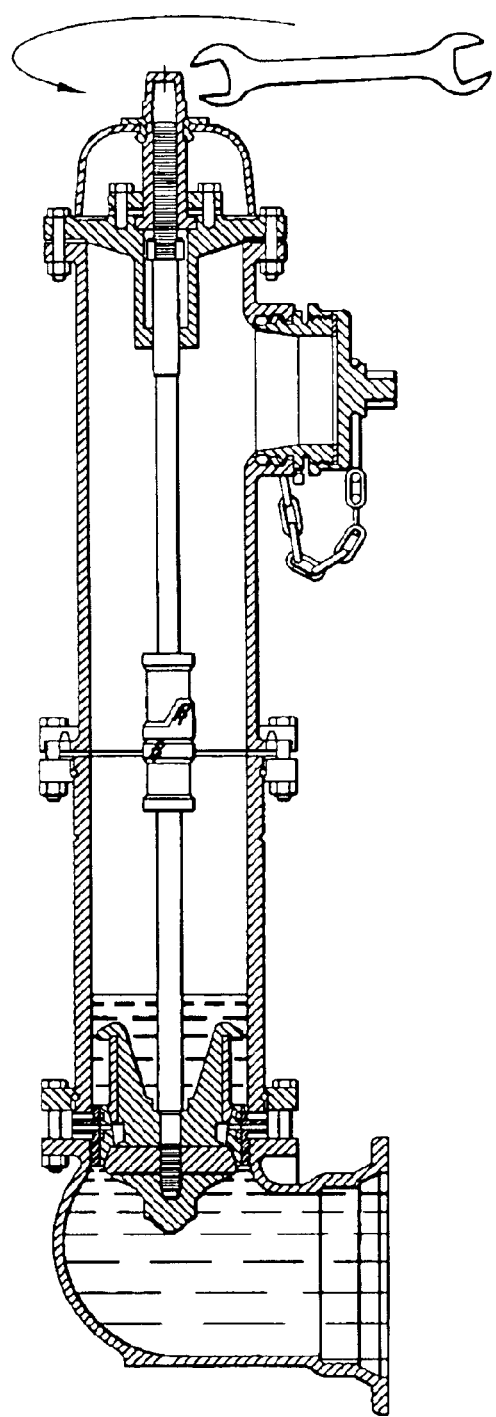
FIG. 4 shows opening of the hydrant valve of the hydrant of FIG. 1 after toxins have been introduced and the nozzle closed.
Figure 5:
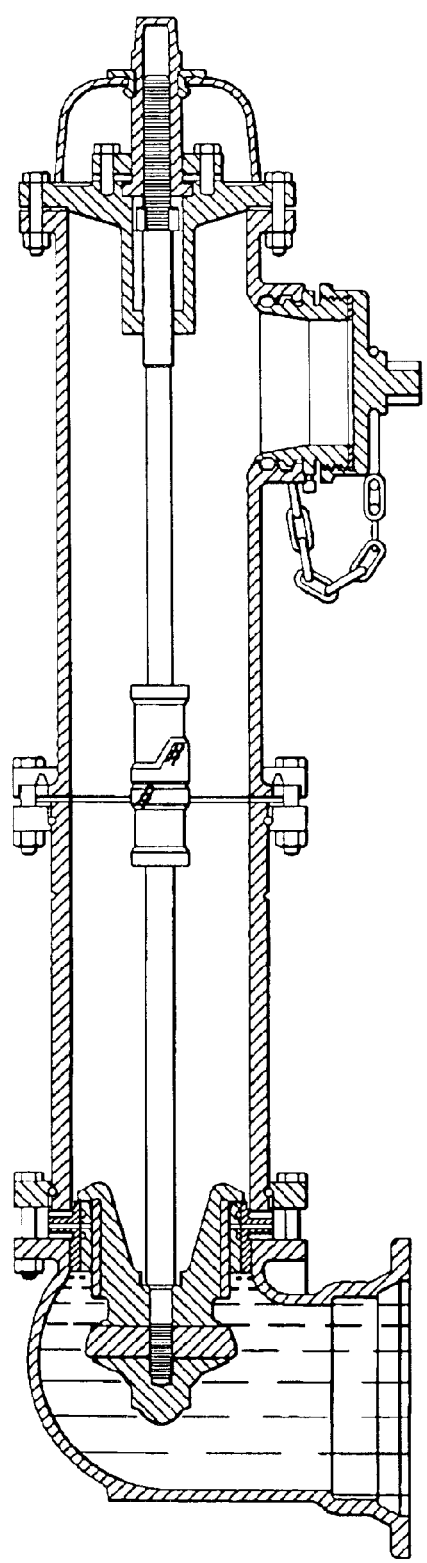
FIG. 5 shows toxins being introduced into a water supply as a result of the sequence shown in FIGS. 1–4.

However, hydrant 10 may also be the subject of attention from miscreants who have the temerity to attempt to introduce toxins into a public water supply. Such concerns have heightened since the date known as "9-11" (Sep. 11, 2001) when terrorists activities became the focus of heightened concern. Accordingly, the need for structures according to various embodiments of the present invention became more apparent after that bellweather event, even if the were foreseen by the inventor named in this document beforehand. More particularly, a person with ill design can attempt to introduce toxins into a water supply 16 taking advantage of the fact that the barrel 12 of a hydrant 10 between the nozzle 26 and the hydrant valve 14 can accommodate several gallons of liquid. Accordingly, as shown in FIGS. 1–4, a malefactor can unscrew cap 28 as shown in FIG. 1, introduce toxins as shown in FIG. 2, screw the cap back on as shown in FIG. 3, and open the hydrant valve 14 as shown in FIG. 4. When the nozzle 26 or all nozzles 26 are closed off and the valve opened, the liquid in the valve can communicate with liquid in the water supply 16 in order to foul the water supply 16 to the potential detriment of all those whose facilities are in communication with such water supply 16.

Various structures according to various embodiments of the present invention prevent or reduce the possibility of such unworthy and direct reprobatory activity. Generally, various structures according to various embodiments of the present invention introduce physical structure between nozzle 26 and hydrant valve 14 through which water flows only when a nozzle 26 and hydrant valve 14 are open. Alternatively or in combination, such structure may close off portions of the barrel 12 below the nozzle 26 in order to deprive miscreants of a space into which to load toxins before closing the nozzle 26 and opening the valve 14.

Figure 6:
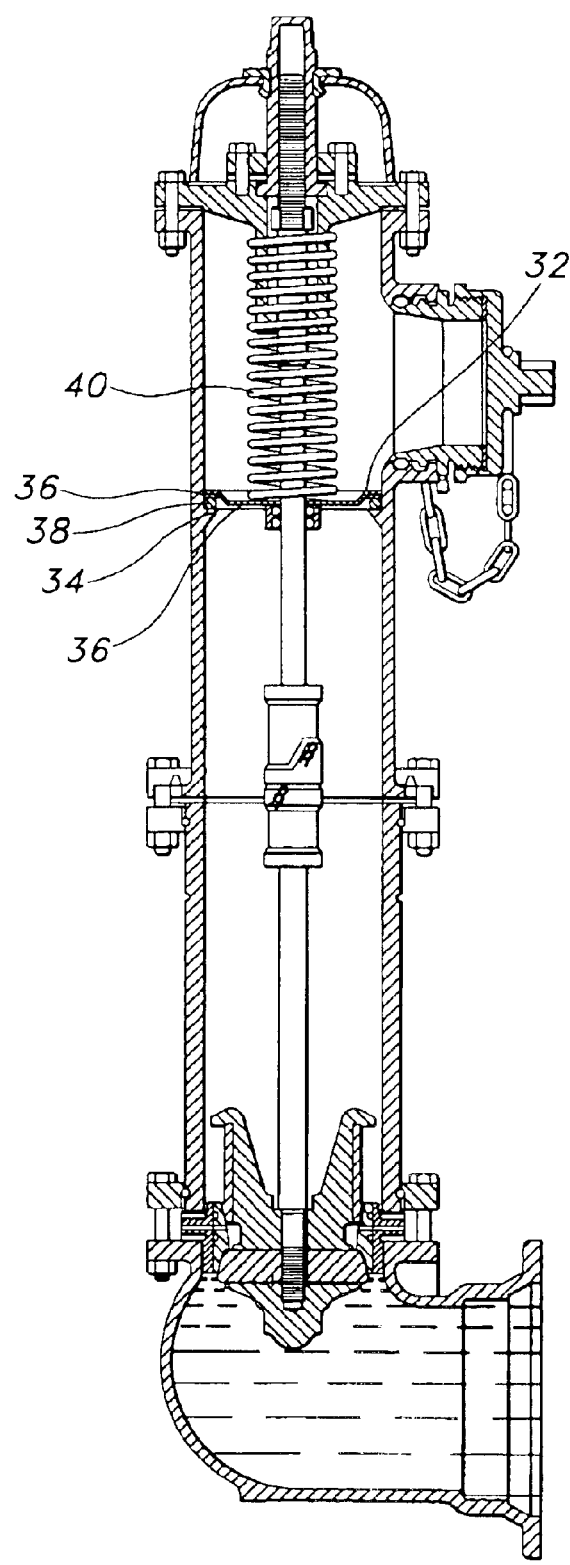
FIG. 6 shows the hydrant of FIG. 1, which can be any conventional hydrant, which includes one embodiment of a second valve according to a preferred embodiment of the present invention.
Figure 7:
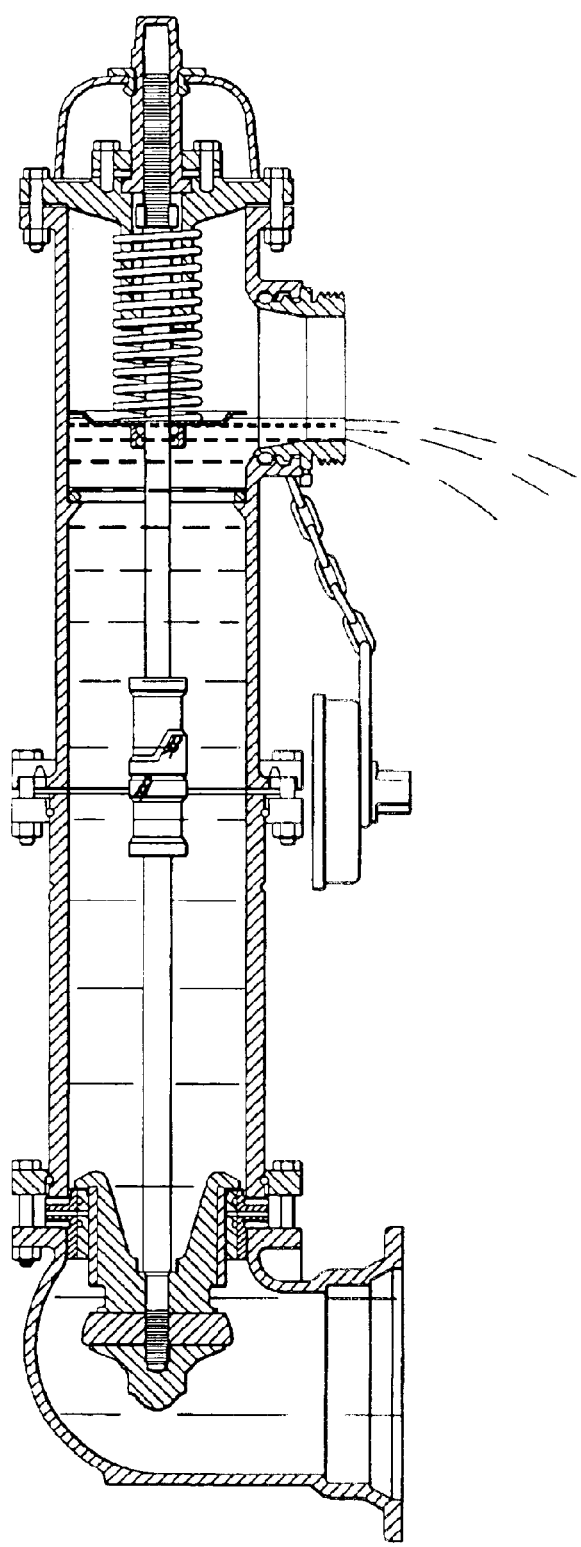
FIG. 7 shows the second valve of FIG. 6 opening as the nozzle cap is removed and the hydrant valve opened.
Figure 8:
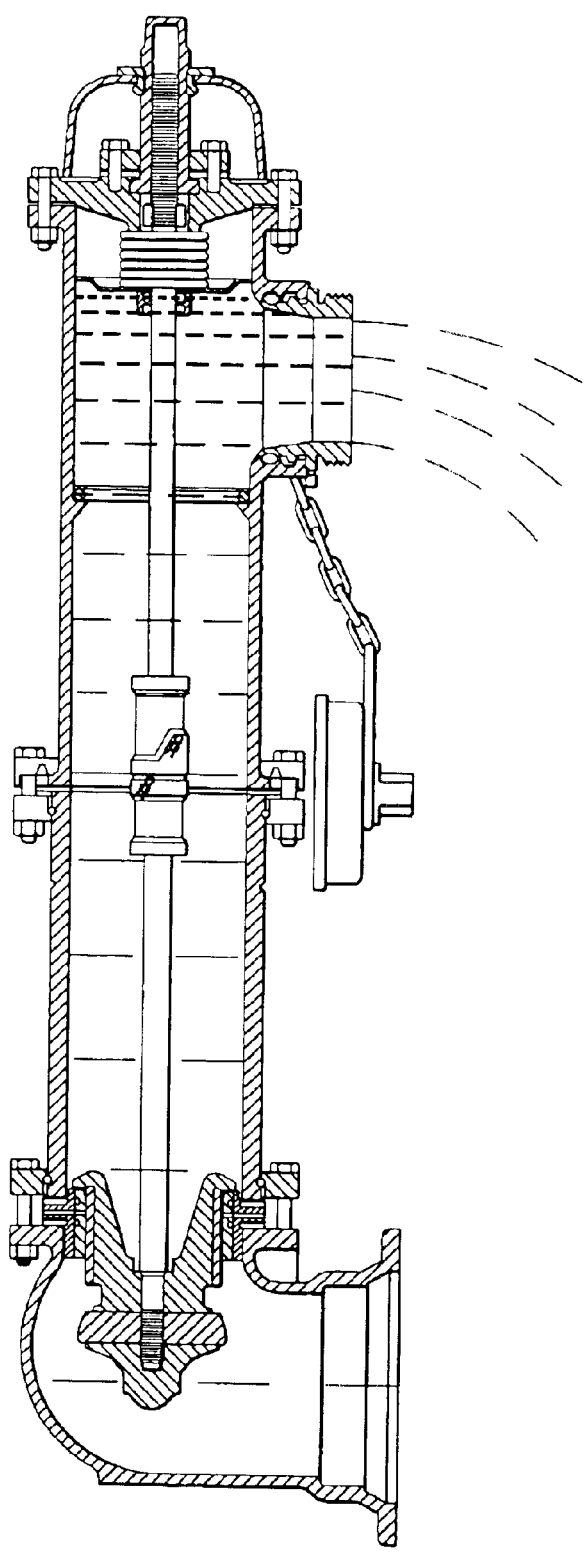
FIG. 8 shows the second valve open as water flows through the hydrant valve, the hydrant, the second valve, and the nozzle.

According to a first embodiment shown in FIGS. 6–8, a second valve 32 according to the present invention operates in logical fashion as an and gate, the logical operands being at least partial openness of both the nozzle 26 and the hydrant valve 14 (or otherwise when water pressure is applied through the barrel 12 to nozzle 26 thus miscreants or others the opportunity to introduce toxins into the hydrant 10.

In the embodiment shown in FIGS. 6–8, second valve 32 includes a seat 34 which is mounted to barrel 12 preferably but not necessarily in a manner which allows valve 32 to be retrofitted to the hydrant 10. A restriction member 36 cooperates with seat 34 to obstruct barrel 12 in waterproof or substantially waterproof fashion and thereby prevent or substantially prevent flow of water or other liquids upon certain conditions being met. In addition, the seat 34 and valve 32 close off portions of the barrel 12 to preclude or render more difficult introduction of toxins into the closed-off portions of the barrel 12. In the embodiment shown in FIGS. 6–8, the valve 32 also includes an "O" ring 38 which helps form a seal between seat 34 and barrel 12, on the one hand, and seat 35 and restriction member 36 on the other hand.

A biasing structure 40 can be disposed to bias the restriction member 36 against "O-ring" 38 and/or 40 valve seat 34. Biasing structure 40 may include any of the following, among others: any resilient member such as, for instance, including but not limited to a spring, any form of resilient material shaped or formed as desired, and/or a weight applied to restriction member 36 for biasing via gravity. As discussed below, biasing structure 40 may also include the actuator rod 24 if the restriction member 36 is coupled to the actuator rod 24 to travel in a manner corresponding to travel of rod 24 such as being mounted to rod 24.

Restriction member 36 may be disc shaped to correspond generally to the inside surfaces of barrel 12, and it may include a collar 42 to receive portions of rod 24 in sliding fashion or otherwise being connected to or mounted to rod 24.

When nozzle cap 28 is removed and nozzle 26 is open, the restriction member 36 prevents or substantially prevents toxins or other liquid, solids or materials from being poured into the barrel 12 below the nozzle 26. A reprobate, miscreant, villain or other unworthy type with ill will cannot push down on or puncture restriction member 36 to open up the barrel 12 according to restriction members 36 formed according to preferred embodiments of the invention which provide suitable resistance to deformation or destruction such as by screwdrivers, crow bars, or other implements employed on occasion by those with ill design or for other purposes. Such malefactory activity is prevented because the restriction member 36 closes off second valve 32 in all cases except where wider is flowing outwardly from water supply 16 through nozzle 26.

A logical table for operation of second valve 32 as shown in FIGS. 6–8 is shown in Table 1 may be as follows, where "O" means "open" and "C" means closed:

TABLE 1

| | | | | |
|---|---|---|---|---|
| Hydrant Valve | O | C | O | C |
| Nozzle | O | C | C | O |
| Second Valve | O | C | C | C |
| Flow from water supply through nozzle | Y | N | N | N |

According to a second embodiment, restriction member 36 is mounted to rod 24 in order to move with rod 24. In this embodiment, the restriction member 36 seats against bottom portions of valve seat 34 or an O-ring 38 interposed below valve seat 34 so that second valve 32 opens when and only when rod 24 moves down, which also means that hydrant valve 14 is opening. In this embodiment, the second valve 32 could, unlike the valve of embodiment one, at least theoretically open to some extent when hydrant valve 14 is open but nozzle 26 is closed. As a practical matter, that makes no difference since cap 28 is on the nozzle 26 preventing introduction of undesired materials into hydrant 10. A logical diagram for embodiments of this type is shown in Table 2, the operands being at least partial opening of the hydrant valve and the nozzle respectively and again where "O" means "open" and "C" means closed:

TABLE 2

| | | | | |
|---|---|---|---|---|
| Hydrant Valve | O | C | O | C |
| Nozzle | O | C | C | O |
| Second Valve | O | C | O | C |
| Flow from water supply through nozzle | Y | N | N | N |

Any desired physical structure may be employed to accomplish the objective of meeting logical Tables 1 or 2 in order to produce or preclude introduction of undesired materials into fire hydrants. Components of embodiments according to the present invention are preferably durable materials but may be of any desired material. For example, it is conventional for many components of fire hydrants to be bronze, and at least some or all of metallic components of structures according to various embodiments of the present invention may be formed of bronze or other conventional or even unconventional materials. O-rings may be formed of conventional materials used in fire hydrants, or unconventional materials. Suitable resilient structures such as springs which may form biasing structures 40 may be formed of any desired material having requisite modulus of elasticity, durability, costs, and other properties.

Modifications, adaptations, changes, deletions, and additions may be made to various embodiments of the present invention as disclosed in this document without departing from the scope or spirit of the invention.

What is claimed:

1. A fire hydrant, comprising:
   a. a barrel adapted to communicate at least indirectly with a water conduit;
   b. a nozzle extending from the barrel and communicating with the barrel;
   c. a hydrant valve adapted to controllably restrict communication between the barrel and the water conduit;
   d. a valve actuator adapted to allow actuation of the hydrant valve, said actuator comprising an actuator rod;
   e. a cap structure adapted to at least close off the end of the barrel not in communication with the water conduit; and
   f. a second valve for deterring the introduction of toxins into the water conduit, said second valve disposed between the hydrant valve and the nozzle, comprising:
      (i) a seat disposed below the bottom of the nozzle;
      (ii) a restriction member adapted to cooperate with the seat to close off communication between portions of the barrel above the second valve and portions of the barrel below the second valve when the nozzle is open and water is not flowing through the nozzle, wherein a portion of the restriction member receives the actuator rod; and
      (iii) biasing structure adapted to bias the restriction member against the seat so that water from the conduit flows through the nozzle only when the hydrant valve is at least partially open and the nozzle is at least partially open and for regulating the opening of the restriction member.

2. A fire hydrant according to claim 1 in which the second valve restriction member is substantially disc shaped.

3. A fire hydrant according to claim 2 in which the disc is indented to form a flange that is adapted to cooperate with the seat, the indented portion adapted to receive the biasing structure.

4. A fire hydrant according to claim 1 in which the biasing structure is a resilient structure.

5. A fire hydrant according to claim 4 in which the resilient structure abuts the restriction member and the cap structure.

6. A fire hydrant according to claim 4 in which the resilient structure abuts the restriction member and a portion of the rod.

7. A fire hydrant according to claim 4 in which the resilient structure is a spring.

8. A fire hydrant according to claim 1 in which the biasing structure comprises a physical member adapted to push downward on the restriction member.

9. A fire hydrant according to claim 1 in which the biasing structure comprises weight applied to the restriction member to cause force of gravity to bias the restriction member.

10. A fire hydrant according to claim 1 in which the restriction member is connected to the rod to move with the rod, and thus the biasing member comprises the rod.

11. A fire hydrant according to claim 1 in which the second valve further comprises an o-ring interposed between the seat and the restriction member.

12. A fire hydrant according to claim 1 in which the second valve is adapted to be retrofitted into the fire hydrant.

13. A fire hydrant according to claim 1 in which the restriction member is adapted to open the second valve when the hydrant valve is open and close the second valve when the hydrant valve is closed.

14. A fire hydrant according to claim 1 in which the restriction member is adapted to close the second valve when the hydrant valve is closed, but not necessarily open the secondary valve when the hydrant valve is open.

15. A fire hydrant, comprising:
    a. a barrel adapted to communicate with a water conduit;
    b. a nozzle extending from the barrel and communicating with the barrel;
    c. a hydrant valve adapted to controllably restrict communication between the barrel and the water conduit;
    d. a valve actuator adapted to allow actuation of the hydrant valve, said actuator comprising an actuator rod;
    e. a cap structure adapted to at least close off the end of the barrel not in communication with the water conduit; and
    f. a second valve for deterring the introduction of toxins into the water conduit; the second valve disposed between the hydrant valve and the nozzle and adapted to be closed when the hydrant valve is closed, but to permit flow of water when the hydrant valve is at least partially open and the nozzle is at least partially open, wherein a portion of the second valve receives the actuator rod, wherein a seat for the second valve is disposed below the bottom of the nozzle, and wherein the flow of water from the conduit through the barrel regulates the opening of the second valve to permit the flow of water through the nozzle.

16. A fire hydrant according to claim 15, wherein the second valve further comprises a resilient biasing member adapted to bias a restriction member against the seat.

17. A fire hydrant according to claim 15 in which the second valve is adapted to be open when the hydrant valve is open and closed when the hydrant valve is closed.

18. A fire hydrant according to claim 15 in which the second valve is adapted to be closed when the hydrant valve is closed, but not necessarily open when the hydrant valve is open.

19. A fire hydrant, comprising:
    a. a barrel adapted to communicate with a water conduit;
    b. a nozzle extending from the barrel and communicating with the barrel;
    c. a hydrant valve adapted to controllably restrict communication between the barrel and the water conduit;
    d. a valve actuator adapted to allow actuation of the hydrant valve, said actuator comprising an actuator rod;
    e. a cap structure adapted to at least close off the end of the barrel not in communication with the water conduit; and
    f. a second valve for deterring the introduction of toxins into the water conduit, the second valve disposed between the hydrant valve and the nozzle and adapted to be closed when the hydrant valve is closed and open when the hydrant valve is open, wherein a portion of the second valve receives the actuator rod, wherein a seat for the second valve is disposed below the bottom of the nozzle, and wherein the flow of water from the conduit through the barrel regulates the opening of the second valve to permit the flow of water through the nozzle.

20. A fire hydrant according to claim 19 in which the second valve comprises:
    a. the seat mounted to the barrel; and
    b. a restriction member mounted to the rod.

21. A fire hydrant according to claim 19 in which the restriction member is adapted to move in registration with movement of the rod to open the second valve.

22. A fire hydrant according to claim 19 in which the second valve further comprises an o-ring interposed between the seat and the restriction member.

* * * * *